United States Patent
Bosworth et al.

(10) Patent No.: US 9,882,946 B2
(45) Date of Patent: *Jan. 30, 2018

(54) GENERATING CONSOLIDATED SOCIAL CONTENT FOR A USER OF A SOCIAL NETWORKING SYSTEM

(71) Applicant: Facebook, Inc., Menlo Park, CA (US)

(72) Inventors: Andrew G. Bosworth, Palo Alto, CA (US); Chris Cox, Palo Alto, CA (US); Ruchi Sanghvi, Palo Alto, CA (US); Thyagarajapuram S. Ramakrishnan, Saratoga, CA (US); Adam D'Angelo, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,068

(22) Filed: Apr. 29, 2015

(65) Prior Publication Data

US 2015/0244750 A1    Aug. 27, 2015

Related U.S. Application Data

(63) Continuation of application No. 13/962,897, filed on Aug. 8, 2013, now Pat. No. 9,065,791, which is a
(Continued)

(51) Int. Cl.
*G06F 7/00* (2006.01)
*H04L 29/06* (2006.01)
(Continued)

(52) U.S. Cl.
CPC ........ *H04L 65/403* (2013.01); *G06F 17/3089* (2013.01); *G06F 17/30876* (2013.01);
(Continued)

(58) Field of Classification Search
CPC ........... G06F 17/30876; G06F 17/3089; G06F 17/30648; G06F 17/30038;
(Continued)

(56) References Cited

U.S. PATENT DOCUMENTS

| 6,266,649 | B1 | 7/2001 | Linden et al. |
| 7,610,287 | B1 * | 10/2009 | Dean ................. G06F 17/30699 |
| 7,664,735 | B2 * | 2/2010 | Zhang ............... G06F 17/30867 |
| | | | 707/723 |
| 7,818,392 | B1 * | 10/2010 | Martino ................ G06Q 10/10 |
| | | | 709/200 |
| 8,171,128 | B2 | 5/2012 | Zuckerberg et al. |
| 8,229,951 | B2 * | 7/2012 | Nickell ............. G06F 17/30864 |
| | | | 707/767 |
| 2005/0171955 | A1 * | 8/2005 | Hull ....................... G06Q 50/01 |
| 2005/0246328 | A1 | 11/2005 | Zhang et al. |
| 2006/0042483 | A1 | 3/2006 | Work et al. |
| 2006/0143067 | A1 | 6/2006 | Calabria |
| 2006/0200434 | A1 * | 9/2006 | Flinn .................... G06N 99/005 |
| | | | 706/12 |

(Continued)

OTHER PUBLICATIONS

European Patent Office, Summons to attend oral proceedings pursuant to Rule 115(1) EPC, European Patent Application No. 07836589.7, Oct. 9, 2015, five pages.

*Primary Examiner* — Mohammed R Uddin
(74) *Attorney, Agent, or Firm* — Fenwick & West LLP

(57) ABSTRACT

To generate dynamic relationship-based content personalized for members of a social networking system, at least one action of one or more members of the social networking system is associated with relationship data for the one or more members to produce consolidated data. One or more elements associated with the consolidated data is identified and used to aggregate the consolidated data. Further exemplary methods comprise weighting by affinity the aggregated consolidated data to generate dynamic relationship-based content personalized for the members of the web-based social network.

14 Claims, 5 Drawing Sheets

Related U.S. Application Data continuation of application No. 12/902,024, filed on Oct. 11, 2010, now Pat. No. 8,521,787, which is a continuation of application No. 11/502,757, filed on Aug. 11, 2006, now Pat. No. 7,827,208.

(51) Int. Cl.
  *G06F 17/30* (2006.01)
  *H04L 29/08* (2006.01)
  *H04L 12/58* (2006.01)

(52) U.S. Cl.
  CPC .............. *H04L 51/16* (2013.01); *H04L 67/22* (2013.01); *H04L 67/306* (2013.01)

(58) Field of Classification Search
  CPC ......... G06F 17/30268; G06F 17/30752; G06F 17/3082; H04L 51/16; H04L 67/306; H04L 67/22
  USPC ................................ 707/802, 795, 812, 712
  See application file for complete search history.

(56) References Cited

U.S. PATENT DOCUMENTS

| | | | |
|---|---|---|---|
| 2006/0218153 A1* | 9/2006 | Voon | G06F 17/30873 |
| 2006/0242581 A1 | 10/2006 | Manion et al. | |
| 2007/0162458 A1* | 7/2007 | Fasciano | G06Q 10/00 |
| 2008/0005072 A1* | 1/2008 | Meek | G06F 17/30867 |
| 2008/0288612 A1* | 11/2008 | Kwon | G06Q 10/00 709/220 |
| 2013/0066852 A1* | 3/2013 | Rose | G06F 17/30867 707/722 |

\* cited by examiner

GENERATING CONSOLIDATED SOCIAL CONTENT FOR A USER OF A SOCIAL NETWORKING SYSTEM

CROSS REFERENCE TO RELATED APPLICATIONS

This application is a continuation of U.S. application Ser. No. 13/962,897, filed Aug. 8, 2013, which is a continuation of U.S. application Ser. No. 12/902,024, filed Oct. 11, 2010, now issued as U.S. Pat. No. 8,521,787, which is a continuation of U.S. application Ser. No. 11/502,757, filed Aug. 11, 2006, now issued as U.S. Pat. No. 7,827,208, each of which are incorporated by reference in their entirety.

BACKGROUND

The present invention relates generally to social networking, and more particularly to systems and methods for generating dynamic relationship-based content personalized for members of a web-based social network.

As social networking has grown more popular, the information available to each member has become voluminous. Accordingly, members may be inundated with information that does not interest the members. Further, members may find themselves unable to find in a timely and efficient manner the information that does interest them, such as information about their friends and their community. There is therefore a need for systems and methods for generating dynamic relationship-based content personalized for members of a web-based social network.

SUMMARY

Systems and methods for generating dynamic relationship-based content personalized for members of a web-based social network are provided. An exemplary method comprises storing at least one action of one or more members of a web-based social network, accessing relationship data for the one or more members, associating the at least one action with the relationship data to produce consolidated data, identifying one or more elements associated with the consolidated data, and aggregating the consolidated data based on the one or more elements to produce aggregated consolidated data. Further exemplary methods comprise weighting by affinity the aggregated consolidated data to generate dynamic relationship-based content personalized for the members of the web-based social network.

An exemplary system for generating dynamic relationship-based content personalized for members of a web-based social network comprises a database configured for storing at least one action of one or more members of a web-based social network, a database configured with relationship data for the one or more members of the web-based social network, a processing module configured with an association component to associate the at least one action with the relationship data to produce consolidated data, the processing module configured with an identification component to identify one or more elements associated with the consolidated data, and the processing module configured with an aggregation component to aggregate the consolidated data based on the one or more elements to produce aggregated consolidated data. A further exemplary system comprises the processing module configured with an affinity component to weight by affinity the aggregated consolidated data to generate dynamic relationship-based content personalized for the members of the web-based social network.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Systems and methods for generating dynamic relationship-based content personalized for members of a web-based social network are provided. At least one action of one or more members of a web-based social network is associated with relationship data for the one or more members to produce consolidated data. One or more elements associated with the consolidated data are identified and used to aggregate the consolidated data. Further exemplary methods comprise weighting by affinity the aggregated consolidated data to generate dynamic relationship-based content personalized for the members of the web-based social network.

Figure 1:
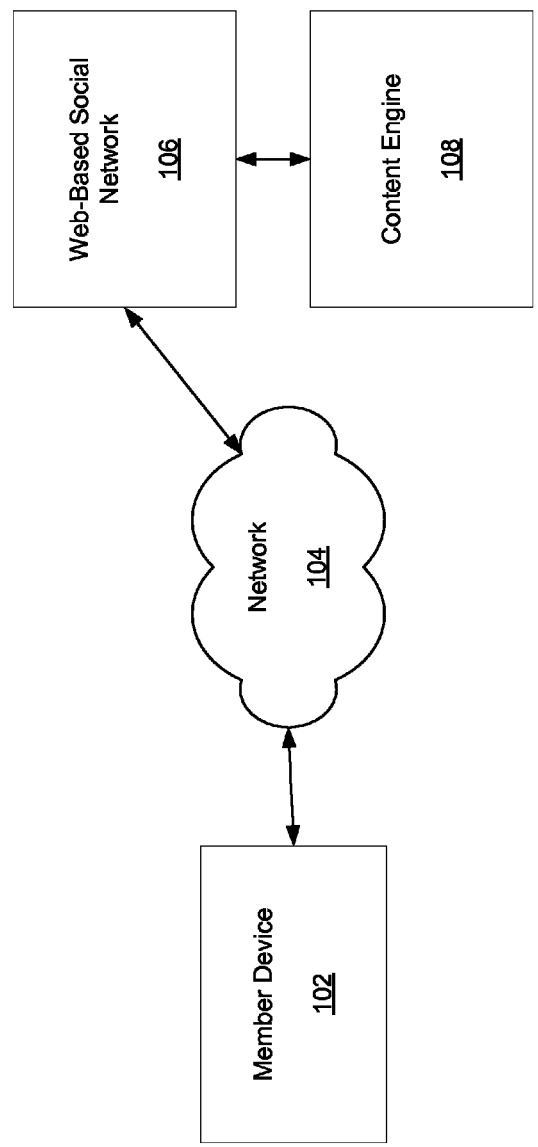
FIG. 1 illustrates an exemplary environment for generating dynamic relationship-based content personalized for members of a web-based social network.

FIG. 1 illustrates an exemplary environment for generating dynamic relationship-based content personalized for members of a web-based social network. One or more members, such as a member at a member device 102, are coupled to a web-based social network 106 via a network 104.

The web-based social network 106 may comprise any entity that provides social networking services, communication services, dating services, and so forth. For example, the web-based social network 106 may host a website that allows one or more members, such as the member at the member device 102, to communicate with one another via the website. In one instance, a first member associated with the member device 102 may communicate with one or more second members associated with one or more second member devices via a social networking website associated with the web-based social network 106. The social networking website offers the member an opportunity to connect or reconnect with the one or more second members that attended, for example, the same university as the member.

According to exemplary embodiments, one or more networks or communities may be provided for each member. For example, the member may have a network comprised of people grouped according to a university attended, a network comprised of people grouped according to the member's geographical location of residence, a network comprised of people grouped according to a common field of work, a network comprised of people grouped according to a particular business, and so forth.

A content engine 108 is coupled to the web-based social network 106. The content engine 108 utilizes action and relationship data about the one or more members, such as the member at the member device 102, to generate dynamic relationship-based content personalized for members of the web-based social network 106. According to some embodiments, the member device 102 may be directly coupled to the content engine 108. According to other embodiments, the content engine 108 comprises a module associated with the web-based social network 106.

Figure 2:
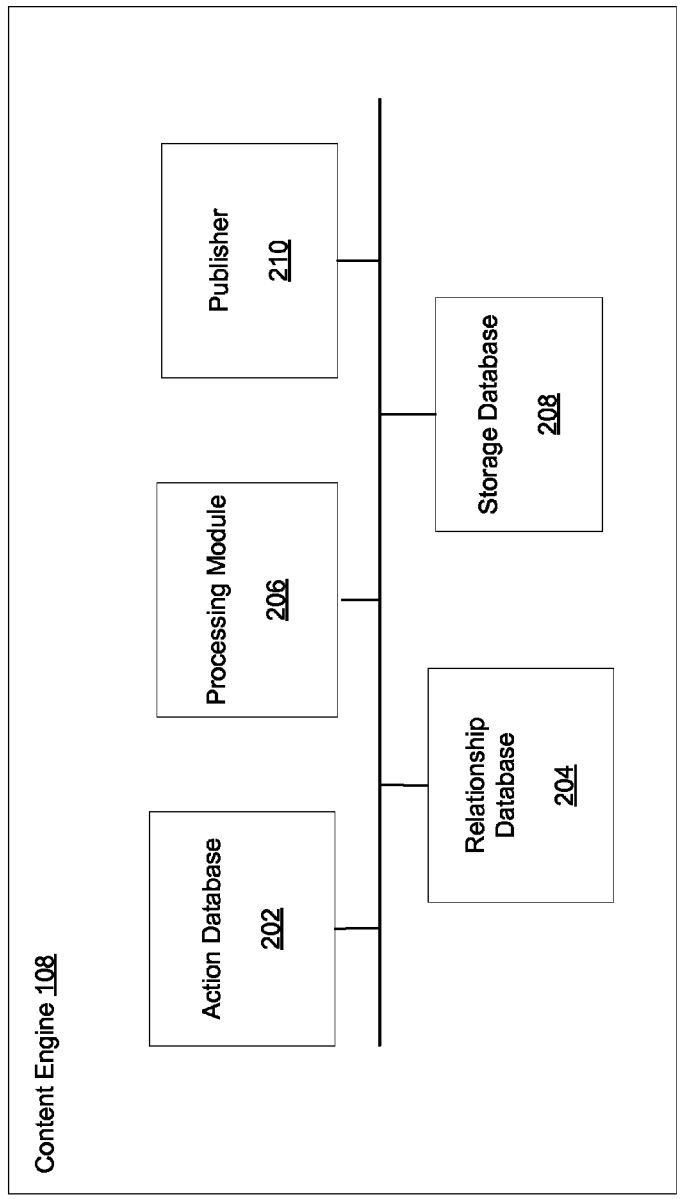
FIG. 2 is a block diagram of an exemplary content engine.

Referring now to FIG. 2, a block diagram of an exemplary content engine is shown. Exemplary content engine 108 comprises an action database 202, relationship database 204, processing module 206, storage database 208, and publisher 210.

An action database 202 may store one or more member actions or activities on the web-based social network 106 (FIG. 1). For example, the action database 202 may store member actions with one or more items of content, such as news stories, other members' profiles, and/or email provided via the web-based social network 106. Any type of member action may be stored in the action database 202.

According to exemplary embodiments, action data may represent a particular member's actions on the web-based social network 106 for a particular period of time, such as the most recent hour, six hours, day, week or month. For example, Member A's action data may represent Member A's actions for the last hour of sending an email to another member, electing to attend a concert with three other members, and adding a photo to Member A's profile.

A relationship database 204 is provided for storing relationship data associated with each of the members, such as the member associated with the member device 102 (FIG. 1). According to exemplary embodiments, relationship database 204 comprises a member profile for each member of the web-based social network 106. When a member joins web-based social network 106, a member profile may be generated for the member. The member can specify relationships with one or more other members via the member profile, or by any other means. The member can assign categories, groups, networks, and so forth to the one or more other members with which the member has a relationship. The relationship, for example, may specify that the member is a friend, friend of a friend, family member, schoolmate, ex-girlfriend, and so forth. Any type of relationship may be specified. Further, the member may group other members according to one or more categories. When the member updates information in the member profile, such as adding additional contacts or friends, the member profile in the relationship database 204 may be updated with the information added.

Figure 3:
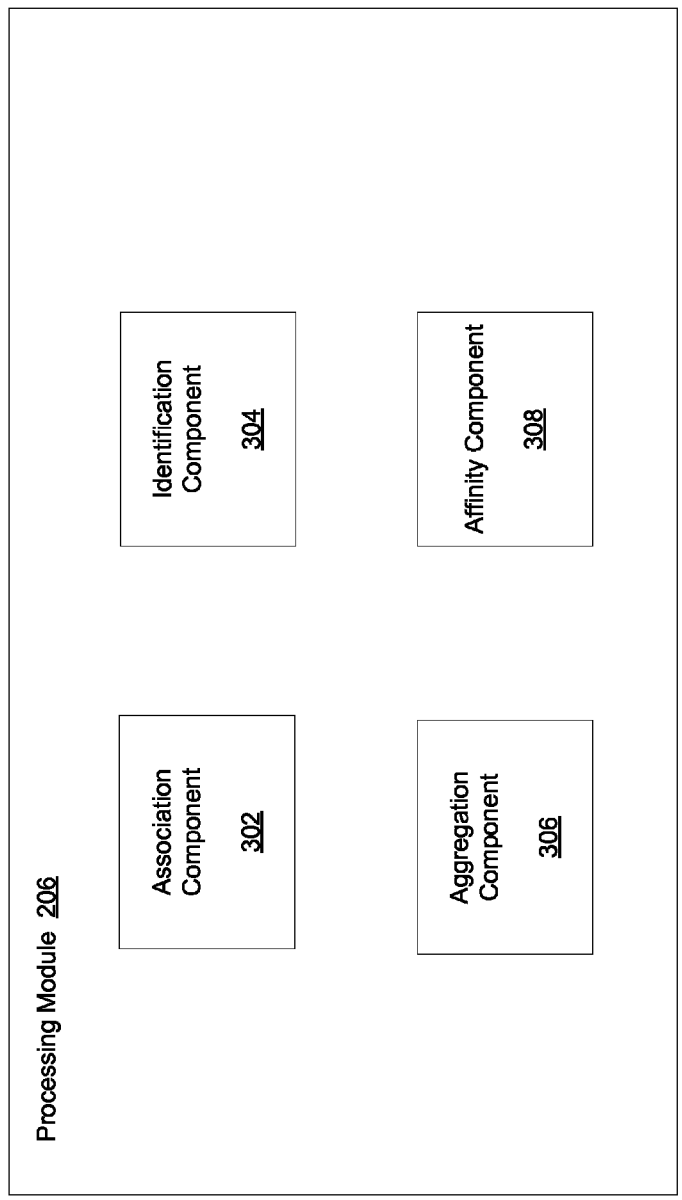
FIG. 3 is a block diagram of an exemplary processing module.

According to some embodiments, processing module 206 is provided for performing several functions as described herein in connection with FIG. 3. Among other things, processing module 206 is responsible for associating member actions with member relationship data to produce consolidated data. Processing module 206 identifies one or more elements associated with the consolidated data and aggregates the consolidated data based on the one or more elements to produce aggregated consolidated data. In a further embodiment, processing module 206 weights by affinity the aggregated consolidated data to generate dynamic relationship-based content personalized for the members of the web-based social network 106. Storage database 208 may be provided for storing the generated dynamic relationship-based content personalized for the members of the web-based social network 106.

Publisher 210 may be provided for publishing the generated dynamic relationship-based content personalized for the members of the web-based social network 106. According to one embodiment, publisher 210 comprises a server configured to send the generated dynamic relationship-based content to a member for whom the content has been personalized. In a further embodiment, publisher 210 is configured to format content in a predetermined arrangement style for presentation to the member of the web-based social network 106.

Although the exemplary content engine 108 is described as being comprised of various components (the action database 202, the relationship database 204, processing module 206, storage database 208, and publisher 210), fewer or more components may comprise the content engine 108 and still fall within the scope of various embodiments.

FIG. 3 is a block diagram of an exemplary processing module. As described in connection with FIG. 2, according to one embodiment, processing module 206 comprises an association component 302, an identification component 304, an aggregation component 306, and an affinity component 308.

Association component 302 is configured to associate one or more member actions with the member's relationship data to produce consolidated data. For example, Member A's profile may include fifteen friends of Member A and another twenty friends of Member A's friends ("friends of friends"). Association component 302 will associate Member A's actions with Member A's friends, friends of friends, and/or other members. For instance, association component 302 might associate Member A's action of joining a group dedicated to the band "Green Day" with Member A's friends who also belong to the same group. In this example, the produced consolidated data might be in the form of "Member A joins Green Day Group, which also includes Member A's friends Pete and Bill."

An identification component 304 may be provided as part of processing module 206 to identify one or more elements associated with the consolidated data. For example, with respect to consolidated data in the form of "Member A joins Green Day Group, which also includes Member A's friends Pete and Bill," identification component 304 might identify the elements of "Green Day." According to some embodiments, identification component 304 may identify any element of an action associated with relationship data (to form consolidated data). For example, identification component 304 may identify an element based on action type, members involved, media or content type, and/or multiple elements thereof. The identified elements are used to aggregate consolidated data, as described herein.

According to some embodiments, aggregation component 306 is provided to aggregate the consolidated data based on the one or more elements to produce aggregated consolidated data. For example, aggregation component 306 might utilize the elements of "Green Day" to aggregate the consolidated data of "Member A joins Green Day Group, which also includes Member A's friends Pete and Bill," with other consolidated data sharing the same elements of "Green Day." In this example, aggregation by aggregation component 306 might result in aggregated consolidated data in the form of "Member A and fifty other members of Member A's community join the Green Day Group." Aggregation component 306 may utilize other parameters or criteria for aggregation and remain within the scope of embodiments claimed herein.

According to some embodiments, affinity component 308 is provided to weight by affinity the aggregated consolidated data to generate dynamic relationship-based content personalized for members of web-based social network 106. Based on one or more member activities and associated relationships, an affinity for past, present, or future content may be determined by the affinity component 308. Any type of variable may be considered when determining an affinity for the affinity component 308 to weight the aggregated consolidated data. In a further embodiment, affinity component 308 may be utilized to assign an order to the content presented to the member. For example, a story about Member B breaking up with Member C may be rated lower than a story about Member A's brother having a baby, and accordingly, the story about Member B breaking up with Member C may appear below the story about Member A's brother having a baby.

Figure 4:
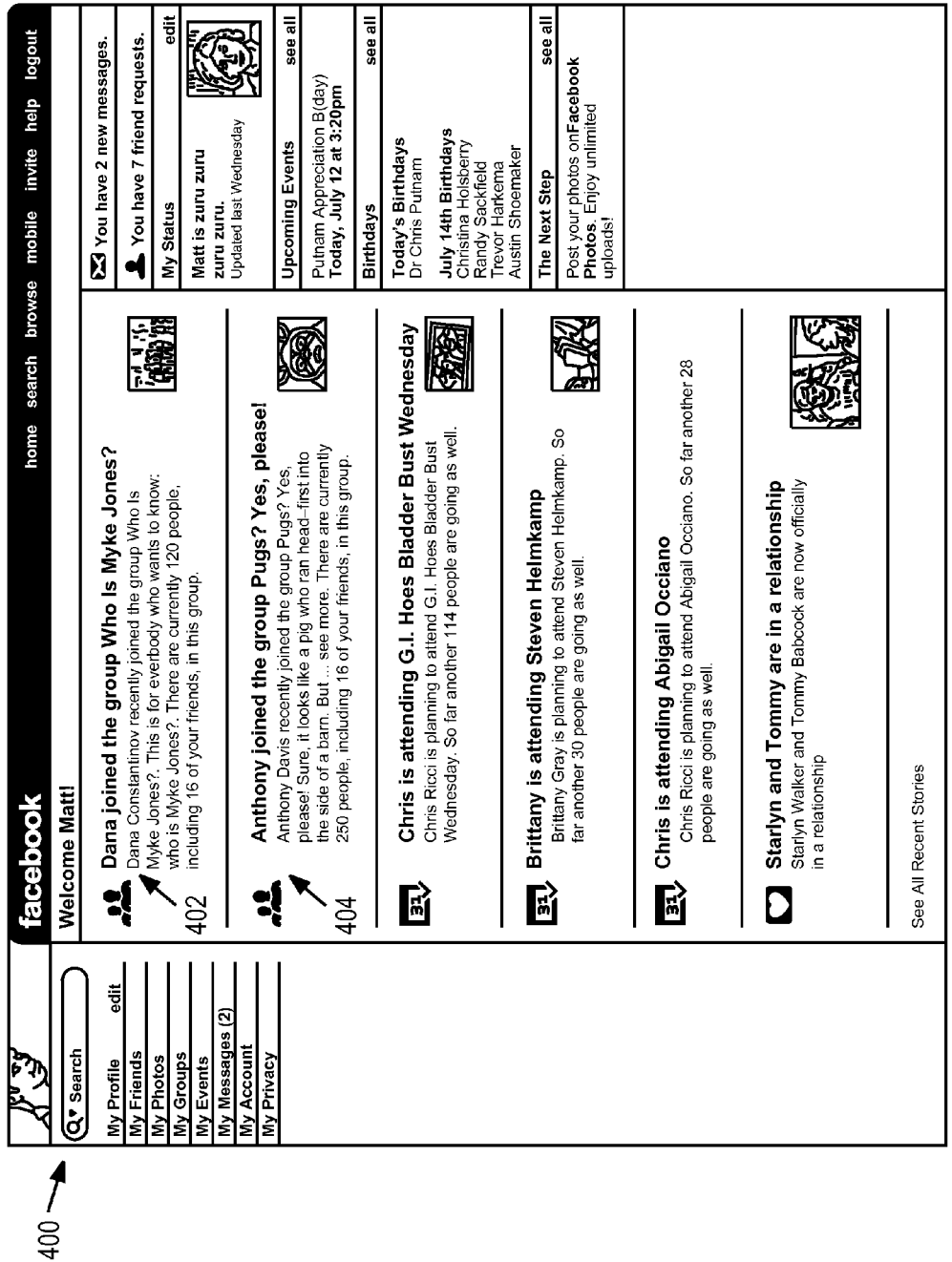
FIG. 4 is an exemplary screen shot of items of generated dynamic relationship-based content personalized for a member of a web-based social network.

FIG. 4 is an exemplary screen shot of items of generated dynamic relationship-based content personalized for a member of a web-based social network. The exemplary screen shot 400 represents the display page associated with a particular member, such as the member at member device 102. Various stories, content, and so forth may be displayed via the display page. In the exemplary screen shot shown in FIG. 4, several stories and/or story headlines are displayed.

A first story 402, entitled "Dana joined the group Who is Myke Jones?" is rated highest according to affinity. An affinity may have been assigned to each story appearing on the display page, based on the member's interaction with other content and the member's relationships associated with the member's interaction with the other content. The stories are then displayed in an order according to the affinity. For example, the first story 402 is assigned the highest order based on the affinity determined for the member for content and/or other members included in the first story 402, while a second story 404, entitled "Anthony joined the group Pugs? Yes, please!", is assigned the second highest order based on the affinity determined for the member with respect to the content and/or the other members included in the second story 404, and so forth.

Although the affinity is determined based on the one or more member activities within the web-based social network 106, according to some embodiments, member activity outside of the web-based social network 106 may also be considered in determining affinity for content and/or other members.

Figure 5:
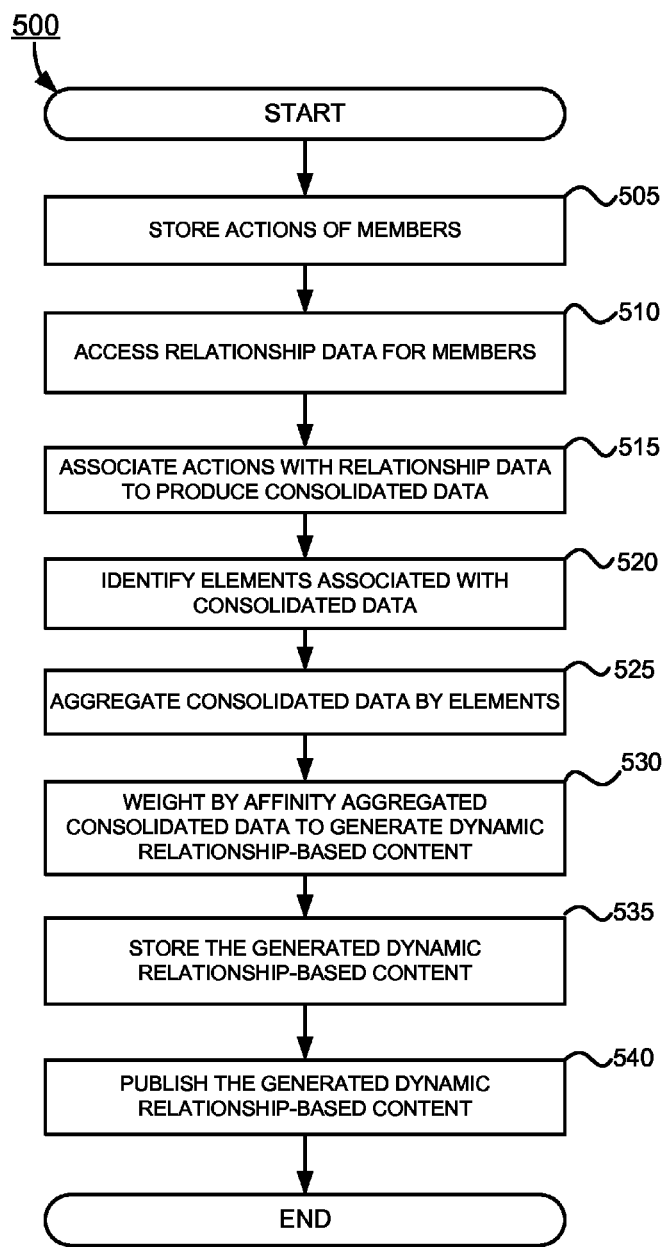
FIG. 5 is a flow diagram of an exemplary process for generating dynamic relationship-based content personalized for members of a web-based social network.

Referring now to FIG. 5, a flow diagram of an exemplary process for generating dynamic relationship-based content personalized for members of a web-based social network is shown.

At step 505, at least one action of one or more members of web-based social network 106 (FIG. 1) is stored. According to one embodiment, member action data may represent a particular member's actions on the web-based social network 106 for a particular period of time.

At step 510, relationship data for the one or more members of the web-based social network 106 is accessed. In one embodiment, a relationship database 204 (FIG. 2) stores data configured in member profiles, including friends and/or friends of friends of members.

At step 515, at least one action (step 505) is associated with the relationship data (step 510) to produce consolidated data. In one embodiment, association component 302 associates a member's actions with the member's friends and/or the member's friends of friends that might have also been involved with the same actions.

At step 520, one or more elements associated with the consolidated data are identified. In one embodiment, an identification component 304 identifies one or more symbols, sounds and/or images associated with consolidated data.

At step 525, the consolidated data is aggregated based on the one or more elements to produce aggregated consolidated data.

At step 530, the aggregated consolidated data is weighted by an affinity to generate dynamic relationship-based content personalized for the members of the web-based social network 106. According to some embodiments, the content may be generated and/or ordered according to a prediction of future member activities.

At step 535, the generated dynamic relationship-based content personalized for the members of the web-based social network 106 is stored.

At step 540, the stored generated dynamic relationship-based content is published for the members of the web-based social network 106. In one embodiment, a server is configured to send the content to a member for whom the content has been personalized.

While various embodiments have been described above, it should be understood that they have been presented by way of example only, and not limitation. For example, any of the elements associated with the content engine may employ any of the desired functionality set forth hereinabove. Thus, the breadth and scope of a preferred embodiment should not be limited by any of the above-described exemplary embodiments.

What is claimed is:

1. A method comprising:
   selecting, from a database of a social networking system, a set of actions that are 1) each separately performed by users of the social networking system connected to a viewing user within the social networking system and that are 2) performed on a common object maintained by the social networking system;
   generating a consolidated story unit for a viewing user that describes the common object maintained by the social networking system, the set of actions, and that identifies the total number of users who performed the set of actions in association with the common object;
   determining a first affinity of the viewing user for the consolidated story unit, the first affinity including an affinity of the viewing user for at least one action of the set of actions, at least one user of the set of users, or the common object;
   determining one or more second affinities of the viewing user for additional story units describing actions performed by users of the social networking system other than the viewing user; and
   providing for display in a feed of stories, to the viewing user, the consolidated story unit and the additional story units ordered with respect to each other in accordance with the determined affinities.

2. The method of claim 1, wherein determining the first affinity of the viewing user for the consolidated story unit further comprises:
   aggregating individual affinities of the viewing user for each of the set of actions; and
   determining that the aggregated individual affinities of the set of actions exceeds a specified affinity threshold.

3. The method of claim 1, wherein determining the first affinity of the viewing user for the consolidated story unit is based on an association of the set of actions and one or more actions performed by the viewing user on web pages external to the social networking system.

4. The method of claim 1, wherein determining the first affinity of the viewing user for the consolidated story unit is based on an association of one or more actions performed by the viewing user within the social networking system and the set of actions sharing the common object.

5. The method of claim 1, wherein determining the first affinity of the viewing user for the consolidated story unit is based on an association of the set of actions associated with at least one of the users joining one or more groups associated with the social networking system and one or more predicted actions for the viewing user within the social networking system, the one or more predicted actions determined based on one or more social activity logged at one or more time periods in association with the viewing user.

6. The method of claim 1, wherein determining the first affinity of the viewing user for the consolidated story unit is based on an association of the set of actions associated with at least one of the users joining one or more groups associated with the social networking system and one or more actions performed by users of the social networking system having a direct friend connection with the viewing user.

7. The method of claim 1, wherein the first set of actions include a common social networking system object.

8. The method of claim 1, wherein the first set of actions include a common class of media content items.

9. The method of claim 1, wherein the first set of actions include a common social profile attribute.

10. The method of claim 1, wherein:
the consolidated story unit comprises a single narrative description unifying the common object, the set of actions, and users related to the set of actions;
the additional story unit comprises a narrative description of a single action associated with a single social networking system user sharing a direct friend connection with the viewing user; and wherein
providing for display, to the viewing user, the consolidated story unit and the additional story units, ordered with respect to each other in accordance with the determined affinities comprises ordering the consolidated story unit and the additional story units for spatial placement in a newsfeed of stories provided to the viewing user, the ordering based on the determined first and second affinities.

11. A computer program product comprising a non-transitory computer-readable storage medium including instructions that, when executed by a processor, cause the processor to:
select, from a database of a social networking system, a set of actions that are 1) each separately performed by users of the social networking system connected to a viewing user within the social networking system and that are performed on a common object maintained by the social networking system;
generate a consolidated story unit for a viewing user that describes the common object maintained by the social networking system, the set of actions, and that identifies the total number of users who performed the set of actions in association with the common object;
determine a first affinity of the viewing user for the consolidated story unit, the first affinity including an affinity of the viewing user for at least one action of the set of actions, at least one user of the set of users, or the common object;
determine one or more second affinities of the viewing user for additional story units describing actions performed by users of the social networking system other than the viewing user; and
provide for display in a feed of stories, to the viewing user, the consolidated story unit and the additional story units ordered with respect to each other in accordance with the determined affinities.

12. The computer program product of claim 11, wherein the instructions that cause the processor to determine the first affinity of the viewing user for the consolidated story unit comprise instructions for determining a numerical measure of a combined interest of the viewing user in the common object, the set of actions, and the users related to the set of actions, the determination of the numerical measure performed by aggregating individual affinities of the viewing user for the combined interest, for actions in the set, and for the users related to the set of actions.

13. The computer program product of claim 11, wherein the instructions that cause the processor to access information about a set of actions performed by the users of the social networking system comprise instructions for selecting actions that share the common object and that occurred within a specified window of time from each other.

14. The computer program product of claim 11, wherein:
the consolidated story unit comprises a single narrative description unifying the common object, the set of actions, and users related to the set of actions;
the additional story unit comprises a narrative description of a single action associated with a single social networking system user sharing a direct friend connection with the viewing user; and wherein
providing for display, to the viewing user, the consolidated story unit and the additional story units, ordered with respect to each other in accordance with the determined affinities comprises ordering the consolidated story unit and the additional story units for spatial placement in a newsfeed of stories provided to the viewing user, the ordering based on the determined first and second affinities.

\* \* \* \* \*